US010366551B2

(12) United States Patent
Drako et al.

(10) Patent No.: US 10,366,551 B2
(45) Date of Patent: *Jul. 30, 2019

(54) ANALYTIC IDENTITY MEASURES FOR PHYSICAL ACCESS CONTROL METHODS

(71) Applicants: Dean Drako, Austin, TX (US); Steven Van Till, Bethesda, MD (US); Eoin Cosgrave, Bethesda, MD (US); John Szczygiel, Bethesda, MD (US); Steven Bryant, Bethesda, MD (US)

(72) Inventors: Dean Drako, Austin, TX (US); Steven Van Till, Bethesda, MD (US); Eoin Cosgrave, Bethesda, MD (US); John Szczygiel, Bethesda, MD (US); Steven Bryant, Bethesda, MD (US)

(73) Assignee: BRIVO SYSTEMS LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,219

(22) Filed: Dec. 4, 2017

(65) Prior Publication Data
US 2018/0089916 A1 Mar. 29, 2018

Related U.S. Application Data

(63) Continuation-in-part of application No. 15/392,240, filed on Dec. 28, 2016, which is a continuation of
(Continued)

(51) Int. Cl.
G07C 9/00 (2006.01)
H04W 4/021 (2018.01)
(Continued)

(52) U.S. Cl.
CPC ..... G07C 9/00103 (2013.01); G07C 9/00571 (2013.01); H04W 4/021 (2013.01);
(Continued)

(58) Field of Classification Search
CPC ............. G07C 9/00103; G07C 9/0071; G07C 2009/00769; G07C 2209/63; H04W 4/021; H04W 4/043; H04W 12/08; H04L 9/3297
(Continued)

(56) References Cited

U.S. PATENT DOCUMENTS 9,077,543 B2 * 7/2015 Luft ...................... H04L 9/3247
9,652,913 B2 * 5/2017 Drako ................ G07C 9/00103

* cited by examiner

Primary Examiner — Kerri L McNally
(74) Attorney, Agent, or Firm — Patentry; Peter G. H. Hwang

(57) ABSTRACT

A personal electronic device enables access to and occupancy of a secure space by providing measures of behaviors, personal attributes, history of transactions and movements that are used to validate continuous authentication and authorization of the device's possessor. This addresses the vulnerability of a misplaced, lost, or stolen electronic credential. An anchor point is a physical measurement of personal physical identity such as voice recognition, fingerprint, iris scan, chemistry, or other biometric. Continuity from an anchor point is measured by GPS way points, financial transactions at familiar vendors, outgoing text messages or passphrases, gait analysis, heart rate, EKG rhythm, or transit time. A request for access is presented upon a challenge based on proximity to a portal location. A digital credential is used to encrypt two or more of the continuity milestones and an anchor point which can be matched against a previously stored or dynamically generated expected value.

11 Claims, 13 Drawing Sheets

Related U.S. Application Data application No. 14/841,711, filed on Sep. 1, 2015, now Pat. No. 9,652,913.

(60) Provisional application No. 62/171,622, filed on Jun. 5, 2015.

(51) Int. Cl.
*H04W 12/08* (2009.01)
*H04W 4/33* (2018.01)
*H04W 4/70* (2018.01)
*H04W 4/80* (2018.01)

(52) U.S. Cl.
CPC ............... *H04W 4/33* (2018.02); *H04W 4/70* (2018.02); *H04W 4/80* (2018.02); *H04W 12/08* (2013.01); *G07C 2009/00769* (2013.01); *G07C 2209/63* (2013.01)

(58) Field of Classification Search
USPC ........................................................ 340/5.61
See application file for complete search history.

ANALYTIC IDENTITY MEASURES FOR PHYSICAL ACCESS CONTROL METHODS

CROSS-REFERENCES TO RELATED APPLICATIONS

This non-provisional application is a continuation-in-part application of currently pending Ser. No. 15/392,240 filed Dec. 28, 2016 which is a continuation of application Ser. No. 14/841,711 filed on Sep. 1, 2015, now U.S. Pat. No. 9,652,913.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to physical access control and identity management, access control mechanisms for managing physical "points of service", physical access portals, or other physical resource access control methods and apparatus, wireless door actuators, locks, and security systems.

Description of the Related Art

Within this application the term physical access portal (portal) refers to a control point or boundary through which a person or vehicle or object can traverse if permitted or be denied transit whether it is an entrance or exit from or to a structure or area or region. Non-limiting examples of portals are doors, gates, lifts, elevators, bridges, tunnels, tubes, vehicles, chair, tow, canal lock, hatch, or wormhole.

As is known, mobile devices including wearable devices, communicating via the cellular telephone network, also include geo-location services by detecting signal strengths and phases from Global Positioning System (GPS) satellites, Wi-Fi Access Points, Cellular Base Stations, Bluetooth beacons, and other non mobile signal emitters which have fixed location. As is known, mobile devices may include circuits for image capture in 2D or 3D in visible and non-visible spectrum and comparison with stored images.

As is known, mobile devices including cellular phones and wearables often include NFC, RFID, and Bluetooth transceivers which can connect with security system readers.

Conventional access control systems depend on one or at most two factors of authentication. Usually a key or key card is a resonator energized by a reader. The reader is hard wired to a server which verifies access time and location of a particular door or entry. Upon presentation of the key card, an identity is transmitted to the server which operates a door lock/unlock solenoid through a wire or network. Mere possession of the key or key card enables access during certain times.

A Key Card is often lost by the user and needs to be replaced. This has a cost associated with it. The user needs to remember to bring the "key card" with them. They often forget and a temporary card needs to be issued. The key card is not always important to the user so they neglect it.

As is known in the industry there is a desire to replace the key card with a personal mobile phone because this eliminates an item that the user must carry—and her personal phone is an item that is important to the user so she takes constant care to retain it.

Mobile phones and other electronic devices do not today typically have an NFC or RFID built in. Many however have Bluetooth function built in. There is a desire to use this function to open the door and many products have been introduced to "read" a Bluetooth signal at the door. This solution, however, requires installation of new hardware at the door, which can be costly.

Another conventional access control system depends on knowledge of a pass code, phrase, numerical combination, or answers to questions. Knowledge of the shared secret enables access during certain times. Some systems use a combination of a NFC reader with a shared secret. Because the channels are essentially bidirectional the shared secret can be stolen.

Alternately, a cryptographic key code which is pseudo-randomly generated by a dedicated dongle has the problem of delivery to an authorized user and retention by the authorized user. It can be left behind, lost, or stolen.

As is known, physical access to the server compromises all security schemes.

What is needed is increased flexibility, granularity, and heightened security for access control. What is needed is a method to utilize mobile wirelessly connected personal devices to open doors without replacing the legacy hardware at the door

BRIEF SUMMARY OF THE INVENTION

A system includes a server coupled to a plurality of wirelessly connected mobile personal devices. The server receives through a wireless communication network a request to enable physical access at a portal using a secure channel and an analytical identity measure from a mobile device. A circuit of the mobile device receives radio signal magnitude, phase, and power from at least one transmitter and authentication input from a user interface. Dual secured communications paths protect the server on its separately provisioned request channel and actuator command channel. Each legacy electronically controlled access portal is enabled to support smartphones without installing a replacement multi-band radio frequency reader at the geo-location.

The mobile device transforms location data from among Global Positioning System satellites, cellular base stations, WiFi Access Points, Bluetooth beacons and other radio emitters with known locations into a coordinate with enough precision to uniquely identify a specific portal on a specific floor of a structure.

An access control server, securely coupled to a door control actuator, determines that a verified user is allowed access according to a rule. An exemplary rule enables physical access to an authenticated user within a range of time at a location when a one-time open command is received via a private channel.

A system couples legacy access controlled doors to modern wireless devices. A smartphone application obtains a location coordinate; the smartphone authenticates a user identity (fingerprint, passphrase, camera, etc.), transmits an access control request via a cellular or WiFi network to the server controlling the access, using a public/private key to protect the server and the facility from attack.

An access control server is coupled to a cellular network or Internet for access requests and also coupled to the equipment that grants access. The user and his location is authenticated for approved access at a portal. A door control signal is transmitted to the door actuator. Each operation will result in a unique request due to the timestamp and prevents recording and playback.

An app is installed from a secure store to a mobile device. A public/private key pair is generated during download, installation, or launch for each instance of an installed app. A public/private key pair may be used for app communications with the access server. A digital certificate may be used for transport layer encryption.

The access server can be provisioned within the secured premises or the access server can be provisioned by a shared service in the cloud.

The access server may be reached via one or more intermediate servers or directly. The app optionally requires authentication of a user by the facilities of the wireless device: by passcode, fingerprint, camera, biometric, etc. Through the cellular network, a request is transmitted to a server to actuate a door access control with a virtual card key. The request is authenticated to a specific device and to a specific user. Each transmitted request is unique.

A personal electronic device enables access to and occupancy of a secure space by providing measures of behaviors, personal attributes, history of transactions and movements that are used to validate continuous authentication and authorization of the person possessing the device.

A plurality of personally identifiable information factors are used to determine the access control decision, including but not limited to: those recorded on the device; those emitted as radio signals from the device; those observed by the authority governing the portal (relying party); and those observed by intermediary or cooperating parties in the system or any combination thereof. These factors are collectively called analytic identity measures (AIMs) in this application.

If a mobile device is misplaced, lost or stolen the AIM will no longer emit stimulus that pertain to the original bearer, and the observation system will detect anomalies in the measures compared to those of the original bearer. This addresses the vulnerability of a device in possession of someone other than the original bearer.

Continuity of authentication and authorization is initiated by one or more anchor measurements to prove possession of the device by the original bearer. An anchor measurement is a strong authentication by a trusted party. An anchor measurement need not be repeated as long as AIM observations are being recorded and/or observed throughout the authentication and authorization continuum. A biometric verification by a trusted party is an example of an anchor measurement.

Continuity from an anchor point is measured by observing movements during transit, such as GPS way points, by analysis and validation of transactions, by monitoring outgoing text messages or passphrases, or verifying traits such as gait analysis, heart rate, EKG rhythm, or transit time.

Built in sensors measure motion, orientation, acceleration, pressure, light, gravity and provide a history of analytic identity measures (AIMs) which are associated with a user's digital credentials in non-transitory storage on the device or in the access control system or both. The AIMs may be raw values, hashed or otherwise transformed representations and may be encrypted for storage and communication either at the device or at the access control system.

Proximity to a controlled access portal may be determined based on a first radio channel such as a GPS location, Bluetooth beacon, or WiFi access point. An orthogonal channel such as cellular data, SMS, or LTE presents a digital credential along with AIMs which may be stored or analyzed. Access control policy for a portal may require one or more digital credentials, one or more AIMs or any combination thereof.

A digital credential can be used to encrypt the private data in AIMs, or to generate a cryptographic hash of AIMs that can be matched against a previously stored hash value. Historic observations of AIMs can be used to create a model of encounters over time. Observations of current AIMs can be matched against expected values generated from the model.

Continuous authentication and authorization utilizes cryptographic keys tightly bound to the device or personal to the user of the device to protect an AIM payload when conveyed to the access control system. The AIM payload may include a digital signature, used by itself as a first measure of authentication. An increasing level of confidence is earned when AIMs match expected values (or their corresponding hashed values) or when AIMs match predicted values based on previously computed models.

A system includes a request processor that receives through a communication network, a request for physical access at a portal using a secure channel from a mobile device to authenticate the user. A system includes an observation subsystem that receives radio signals from at least one transmitter, using signal magnitude, phase and power to estimate proximity to the portal of entry.

A control subsystem, securely coupled to a door control actuator, either directly or through intermediaries, determines that a verified user is allowed access according to one or more rules or policies. An exemplary policy (or rule) enables physical access to an authenticated user within a range of time at a location when a one-time open command is received via a private channel.

The control subsystem is connected to at least one physical access portal and transmits a command to enable or suppress access upon receiving and verifying a request. The wireless network may use Internet Protocol. The wireless network may use cellular data communication protocols.

One skilled in the art will recognize that the various subsystems and components can be provisioned to run: on the mobile device, on dedicated "servers" or "virtual servers", on premises computing equipment or in the "cloud" or as a "software service" from the same or another party.

BRIEF DESCRIPTION OF THE SEVERAL
VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
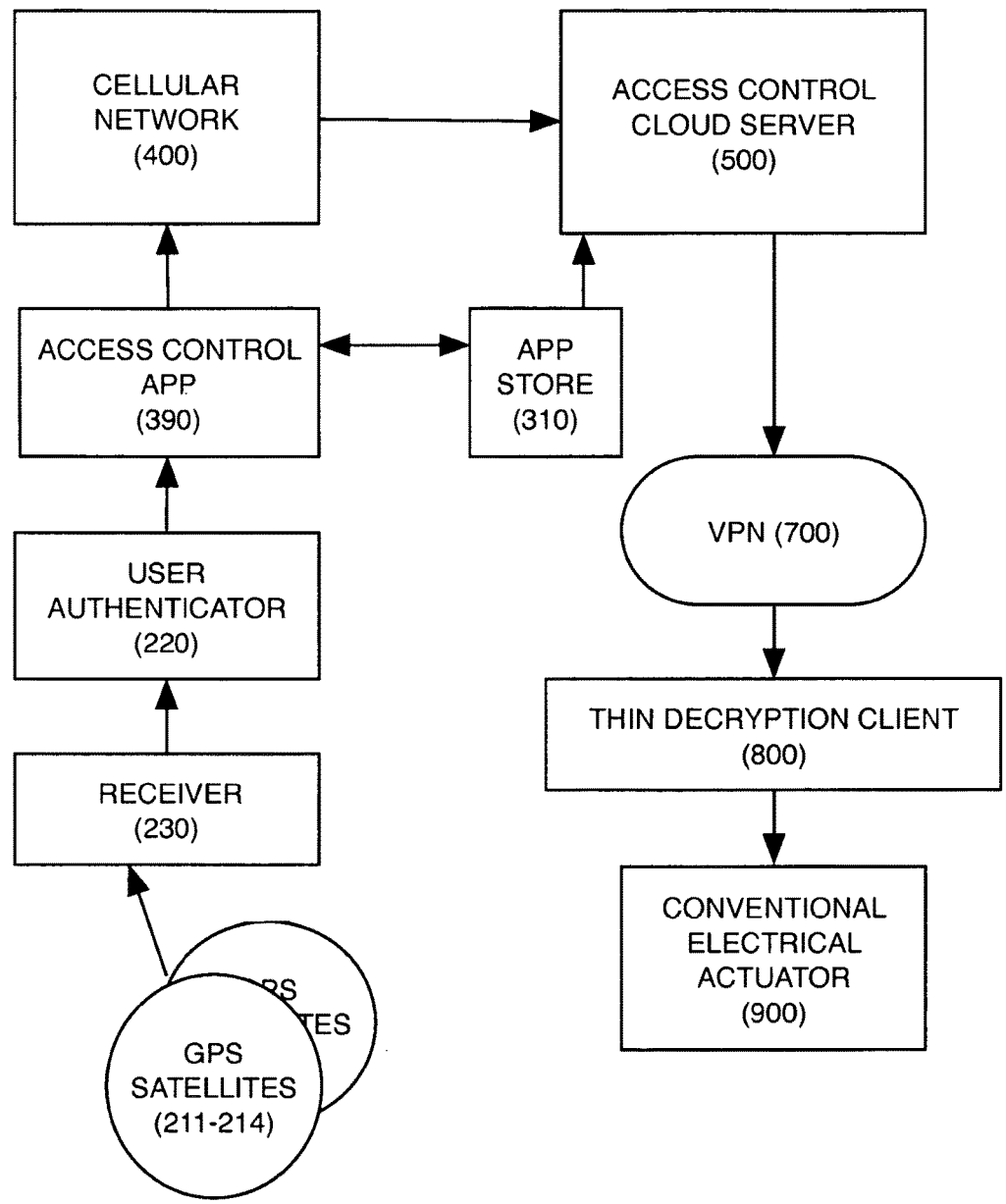
FIGS. 1-4 are block diagrams of embodiments of a system.

Conventional physical access control systems are being disrupted by the capabilities of personal wireless devices such as mobile phones and wearables. These devices are trending toward ubiquity and include compute and location services and identity authentication to protect their data stores in addition to sensors such as accelerometers, pressure, temperature, altitude, and scanners for biometric measures such as iris and fingerprints. Those capabilities combined with wireless connectivity disrupt conventional thinking around access control. The problems with a traditional access control approach include the high cost of purchasing, installing and maintaining equipment and the burden placed on users of these systems. On balancing security against convenience, the user inevitably has a high degree of friction performing normal tasks that he is permitted to perform; while the business owner has a high cost of protecting access in the unlikely event of a security breach.

The present invention solves this problem by using a combination of sensor-detectable, personally identifiable information (PII) factors emitted as radio signals that are used to gain access to portals, doors, gates, perimeters, or other physical demarcations. These measures are collectively called "analytic identity measure" (AIM) in the following.

In one embodiment, the radio-connected, sensor-equipped mobile device is equipped with an accelerometer that uses human stride or gait analysis to detect whether it is being carried, worn, or otherwise transported by the individual associated with one or more identity tokens, credentials, digital keys, or other unique cryptographic signatures (collectively, "digital credentials") that are recognized as valid entry authorization by the electronic access control devices installed to control access to a portal, door, gate, perimeter, or other physical demarcation.

In building a model of the user's expected movements and interactions, the individual user's gait characteristics are associated with one or more digital credentials.

The gait analysis uses a variety of mathematical analytics to uniquely characterize the gait of the individual based on stride length, velocity, vertical and horizontal displacement, frequency analysis of the time-dependent position vector.

Accelerometer measurements combined with location tracking are captured on the device to be matched with the expected routing of the bearer. The travel time from the trip initiation to arrival can be fit within a normal range.

Access may be enabled on the condition when the real-time gait analysis matches the stored gait analysis. One way to do that is to suppress submission of the request when the measurements on the device do not match preloaded historical measures.

In another embodiment, not mutually exclusive of the first, the mobile device is equipped with a GPS receiver that builds a history of "typical approach behaviors" measured over a defined time interval prior to the attempted presentation of the digital credential(s). The history defined by the approach behaviors include such factors as velocity of arrival (e.g., walking, automobile); direction of approach (south, north, etc.); locations visited prior to approach; etc. These behaviors are analyzed with the same mathematical techniques described above and stored in the [cloud-based] access control system that manages the authentication and authorization functions of the electronic access control devices installed in and around a portal, door, gate, perimeter, or other physical demarcation. The history provides a reference model.

In an exemplary embodiment, matching real-time gait analysis to stored gait analysis is a triggering condition for transmission of a digital credential stored in the memory of the mobile device.

In another embodiment, the mobile device is equipped with one or more biometric sensors such as a fingerprint scanner, or a camera for facial recognition. In this case, the bearer must use the biometric sensor to activate the digital credentials. The authority for a given portal, door, etc., or the issuer of one or more of the digital credentials can impose a "time to live" policy requirement on the biometric validation such than the validation (and thus radio transmission of the credential) may only occur within a specified period of time after the biometric validation has been performed. The mobile device may be subject to one or more such policies.

Transmitting the digital credentials at any time where the real-time analytics match a stored analytic pattern would reduce battery life and unnecessarily expose the digital credentials to interception and possible cryptographic analysis that could later be used to falsely gain entry into a controlled perimeter. Instead, they are only transmitted when they are "near" a portal, door, etc., to which the bearer of the mobile device might reasonably wish to gain entry. Therefore, "proximity criteria" are met before the digital credentials are transmitted, even when one or more of the analytic criteria described above have been satisfied.

In one embodiment, proximity may be determined by the broadcast of a digital signal from the electronic access control equipment installed in or around a door, portal, gate, or other physical demarcation. This signal is received by the mobile device, and, if meeting pre-established signal strength criteria, would trigger the radio transmission of the location-coded digital credential.

In a second embodiment, not exclusive of the first, proximity is determined through the use of an embedded GPS device within the mobile device.

In another embodiment, the door or the device receives a verbal prompt to initiate or confirm the access control sequence with speaker recognition of one of a number of pass phrases.

Sensors confirming an authentication sequence include measurement of pressure or movement of the mobile device hidden from view within a pocket or purse.

Otherwise common device use patterns may be overloaded to have access control meaning such as keystroke dynamics, navigating a browser to a range of uniform resource locators (urls), sending a text or verbal message, responding to an email, or playing certain songs in order.

Wearable devices include biometric activity sensors measuring EKG and EEG patterns. Other personal attributes of standing, sitting, pacing, posture, and transit are considered for pattern recognition.

An aspect of the invention is a method for identifying a mobile device user for low impedance physical access control comprising; collecting and analyzing conduct during approach analytic identity measures (C-AIM); collecting and analyzing destination proximity analytic identity measures (D-AIM); and upon verification of the mobile device user, operating an access control actuator.

In an embodiment, collecting and analyzing (C-AIM) comprises: at least one of a sequence of waypoints in approaching a portal; a financial transaction using wireless payment; initiating a message or phone call; passing through mass transit turnstiles or tolls; time and speed in transit on expected routes; measurement of sitting, standing, walking times; and elapsed time operating the mobile device in transit.

In an embodiment, collecting and analyzing D-AIM comprises: at least one of receiving global positioning system coordinates; receiving a Bluetooth beacon signal; receiving a WiFi Access Point MAC address; receiving a calendar invite associated with a portal; receiving an electromagnetic field focused at the destination; receiving a plurality of audio tones concentrated at the destination; and causing a circuit to transmit a credential to an access control server.

Another aspect of the invention is a method for identifying a mobile device user for low impedance physical access control comprising; collecting and analyzing biometric sensor data analytic identity measures (B-AIM); collecting and analyzing conduct during approach analytic identity measures (C-AIM); and collecting and analyzing destination proximity analytic identity measures (D-AIM); and upon verification of the mobile device user, operating an access control actuator.

In an embodiment, collecting and analyzing B-AIM comprises: at least one of an iris scan; a fingerprint scan; a heart rate; a blood pressure; an oxygen level; a body mass; a stride length; a gait; and a total body electrical conductance.

Another aspect of the invention is a method for physical access control to a protected arena which causes a mobile wireless apparatus to perform collecting and verifying a plurality of sensor detectable analytic identity measures, wherein collecting sensor-detectable analytic identity measures comprises: collecting at least one anchor authenticity-analytic identity measures (A-AIM) comprising at least one of a shared secret passphrase, exiting from a secure facility, starting from a known origin, performing an authentication action, capturing a self-portrait, scanning a physical feature, operating a cryptographic device, and recording a handwritten pattern; collecting biometric sensor data-analytic identity measures (B-AIM) comprising at least one of an iris scan, a fingerprint scan, a heart rate, a blood pressure, an oxygen level, a body mass, a stride length, a gait, and a total body electrical conductance; collecting conduct during approach-analytic identity measures (C-AIM) comprising at least one of a sequence of waypoints in approaching a portal, a financial transaction using wireless payment, initiating a message or phone call, passing through mass transit turnstiles or tolls, time and speed in transit on expected routes, measurement of sitting, standing, walking times, and elapsed time operating the mobile device in transit; collecting destination proximity-analytic identity measures (D-AIM) comprising at least one of receiving global positioning system coordinates, receiving a Bluetooth beacon signal, receiving a WiFi Access Point MAC address, receiving a calendar invite associated with a portal, receiving an electromagnetic field focused at the destination, receiving a plurality of audio tones concentrated at the destination, and subsequently, causing a circuit to transmit a credential to an access control server. In an embodiment, the apparatus transforms selected AIMs into an element of the credential prior to transmission.

Another aspect of the invention is a method comprising: collecting a plurality of analytic identity measures (AIMs); configuring at least one access credential; and corresponding with destination access control system, wherein corresponding comprises receiving by a radio device at least one radio signal providing location data, determining a location of the mobile device, and transmitting by the radio apparatus a configured access credential associated with the mobile device and the authenticated bearer on the condition that the location of the mobile device is within a proximity geofence of a portal to a controlled perimeter, whereby the mobile device is radio silent until in a vicinity of a portal.

In an embodiment, configuring at least one access credential comprises: selecting at least one collected analytic identity measure (AIM), and transforming each collected AIM by a timestamp and a digital certificate of the mobile device and bearer, whereby each configured access credential is distinct from every previously transmitted configured access credential.

In an embodiment, collecting a plurality of AIMs further comprises collecting at least one destination analytic identity measure (D-AIM) associated with a location of a portal.

In an embodiment, D-AIM is one of the group of a Bluetooth beacon co-located with a portal actuator, a WiFi access point in the vicinity of a portal actuator, a global positioning system coordinate, a cellular location service, an RFID scanner, and an optical signal source.

In an embodiment, collecting a plurality of AIMs further comprises collecting at least one conduct analytic identity measure (C-AIM) wherein collecting at least one C-AIM comprises: at least one of the group of gait analysis of accelerometer readings to determine stride length, average speed, height and length of step, cadence, steps between directional change, and standing from seated position; financial transactions performed, using transit, food/beverage, fuel, and street vendors; waypoints passed during commute and portal approach based on GPS or location services; and messages sent and received during travel toward portal.

In an embodiment, collecting a plurality of AIMs further comprises collecting at least one biometric analytic identity measure (B-AIM) wherein collecting at least one B-AIM comprises: receiving a sensor initiation trigger from a user interface device; at least one of the group, operating a fingerprint sensor device, operating an iris scanner device, operating a microphone and speaker recognition device, operating a camera and facial recognition device; and successfully matching the sensor recorded data with one of a stored B-AIM.

In an embodiment, collecting a plurality of AIMs further comprises collecting at least one anchor analytic identity measure (A-AIM) wherein collecting at least one A-AIM comprises: operating a cryptographically secure dongle assigned to bearer; receiving a passphrase created by the bearer; receiving answers to security questions stored by the bearer; and receiving biometric sensor data recorded at bearer's origin.

Another aspect of the invention is an apparatus including: a wireless radio circuit; a location sensor; a human biometric sensor; an accelerometer; a cryptographic digital certificate; a store of hashed analytic identity measures; a store of portal location geo-fences; and a user interface for receiving answers to personal identity questions.

Another aspect of the invention is a method for operating a mobile device to perform pre-authentication for a physical access control system, comprising: receiving analytic identity measures observed by sensors on the mobile device; matching analytic identity measures with expected values produced by a model representing a training history; and upon matching currently received AIMs with stored expected AIMs, emitting an access control credential upon proximity to an access portal.

In an embodiment, the mobile device is a wearable computing device. In an embodiment, the mobile device is a vehicle or an apparatus installable into a vehicle.

In an embodiment, the mobile device includes a circuit to identify its user. Such an identification circuit may be a biometric sensor. Such an identification circuit may be a password or pass code stored secret. Such an identification circuit may be a camera or other electromagnetic sensor. Examples include signature, fingerprint, iris, or DNA scanners.

In an embodiment the biometric measurement, image, or signature is transmitted to an identity server or the access control server for verification either directly or through one or more intermediaries.

In an embodiment, the connection into or out of the access control server travels through an encrypted communication channel protected by symmetric, asymmetric, or elliptic curve encryption keys.

In an embodiment, the mobile app receives and exhibits to the user indicia of the access request being granted or denied.

Mobile wireless devices are trending toward ubiquity and include compute and location services and identity authentication to protect their data stores. Those capabilities combined with connectivity disrupt conventional physical access control systems.

An over-the-air installable application provides identity verification, location, and secure communication to an electronic door system.

In one embodiment, a physical access control server is coupled to a wireless network and also connected directly (e.g. wired) to at least one access point or portal. A mobile device performing the instructions of an access control application exchanges information with the physical access control server using the wireless network. The physical access control server determines whether the operator of the mobile device is allowed access according to rules and then causes the portal to admit or deny transit.

In one embodiment the physical access control server is located at a shared infrastructure data center remote from the location of the portals and coupled by a network to a panel controlling operation of the portals.

In one embodiment, the physical access control server is provisioned within the boundaries of the structure, region, area, or facility protected by the physical access control system.

One aspect of the invention is a system for physical access control of a structure or an area which system includes at least one mobile wireless device which combines a cellular communication transceiver and at least one receiver enabled to receive and measure GPS, Bluetooth, or WiFi radio signals, their signal strength, and the phase of clock signals and pseudo-random codes; a physical access portal located at a known global positioning system coordinate; a physical access control server coupled to a wireless network and further coupled to an actuator operable to secure or release the physical access portal; and a store of user identities and time windows when an authenticated user may traverse the physical access portal within a range set by an administrator of a global positioning system coordinate.

Proximity to a signal source measured by signal strength such as a Bluetooth beacon or WiFi Access Point may trigger a physical access control application to launch.

In an embodiment, the physical access control server is provisioned within the premises of at least one physical access portal, or is remotely provisioned by a shared service provider.

In an embodiment, a mobile wireless device further includes a circuit for identity verification.

In embodiments, a circuit for identity verification can be a camera, a passcode checker, a biometric sensor, or an accelerometer.

In an embodiment, a mobile wireless device also includes a circuit to determine proximity-traits and rules to evaluate traversal-traits.

In embodiments, the physical access portals include but are not limited to an electrically operable hatch, gate, bridge, door, elevator, vehicle, seat, tow, or tube.

In an embodiment, the physical access control server is coupled to a panel in replacement of badge energizer/readers.

In embodiments, the access control rule may be provisioned to and evaluated at the panel, at the access control server, or at the mobile device.

In an embodiment, the method also includes transmitting biometric information of the user to the physical access control server.

In an embodiment, the method also includes determining whether a mobile wireless device is within range of a stored geo-location coordinate as a prior condition to transmitting a physical access request to a server.

In embodiments, the execution of the processes occur in an app or in a browser.

In an embodiment, the method also includes verifying the identity biometrically and acknowledging the successful enablement.

In an embodiment, the method also includes emulating an NFR/RFID keycard resonator/reader to an access control panel.

EXEMPLARY EMBODIMENTS

Referring to FIG. 1, a system comprises an Access Control App 390 (App) which has been down loaded from a public or private App Store 310 and installed on a mobile communication device (smartphone). The App receives a GLE coordinate from a Receiver 230 which is a component of the smartphone, and a user identity from a user authenticator (220) component of the user interface of the smartphone. Using a unique encryption key generated with the App Store for each App instance, the App transforms the GLE coordinates and the user identity into an access request which is communicated through the cellular network (400) to an Access Control Cloud Server 500 (Server). The receiver 230 transforms signal measurements and payload from transmitters such as but not limited to GPS satellites 211-214 into a geo-location estimate coordinate.

The Access Control Cloud Server 500 has stored decryption keys, user identities, door locations, and time and place access rules. After determining the user and the App are authenticated, the Server determines the closest door within a range of the smartphone and sends an actuator command to a conventional electrical actuator 900 (Actuator). Being in the cloud, a virtual private network 700 couples the Server to a thin decryption client 800 for delivery to the actuator.

Figure 2:
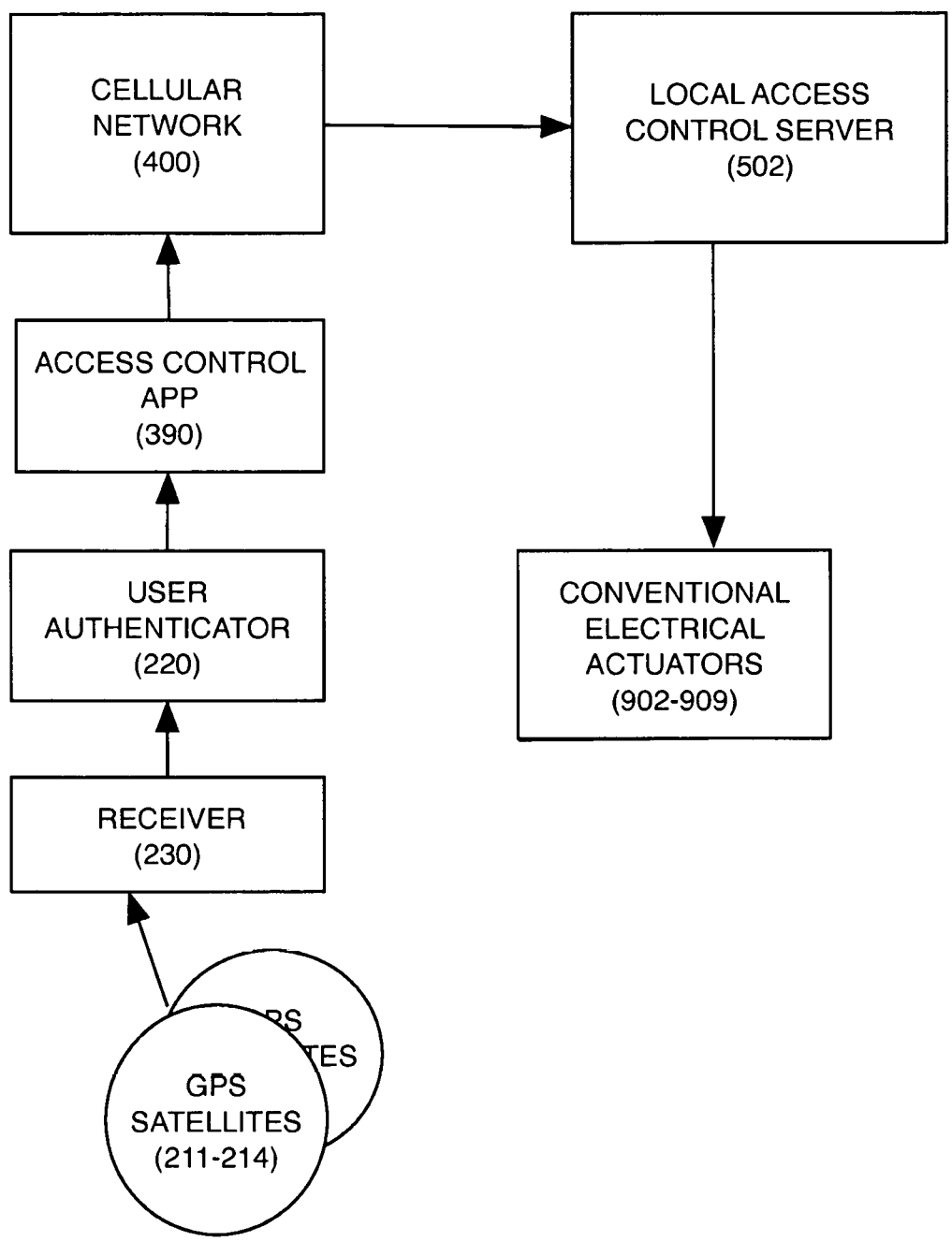

Referring now to FIG. 2, in an embodiment, a system includes: a local access control server 502 (server); the server further coupled to one or more electrical actuators 902-909; the server further coupled to an access control App 390 (App) via a cellular network 400; the App further coupled to a user authenticator 220, and to a receiver providing location services 230, which in an embodiment derives a geo-location estimate from signals provided by a plurality of GPS satellites 211-214.

Figure 3:
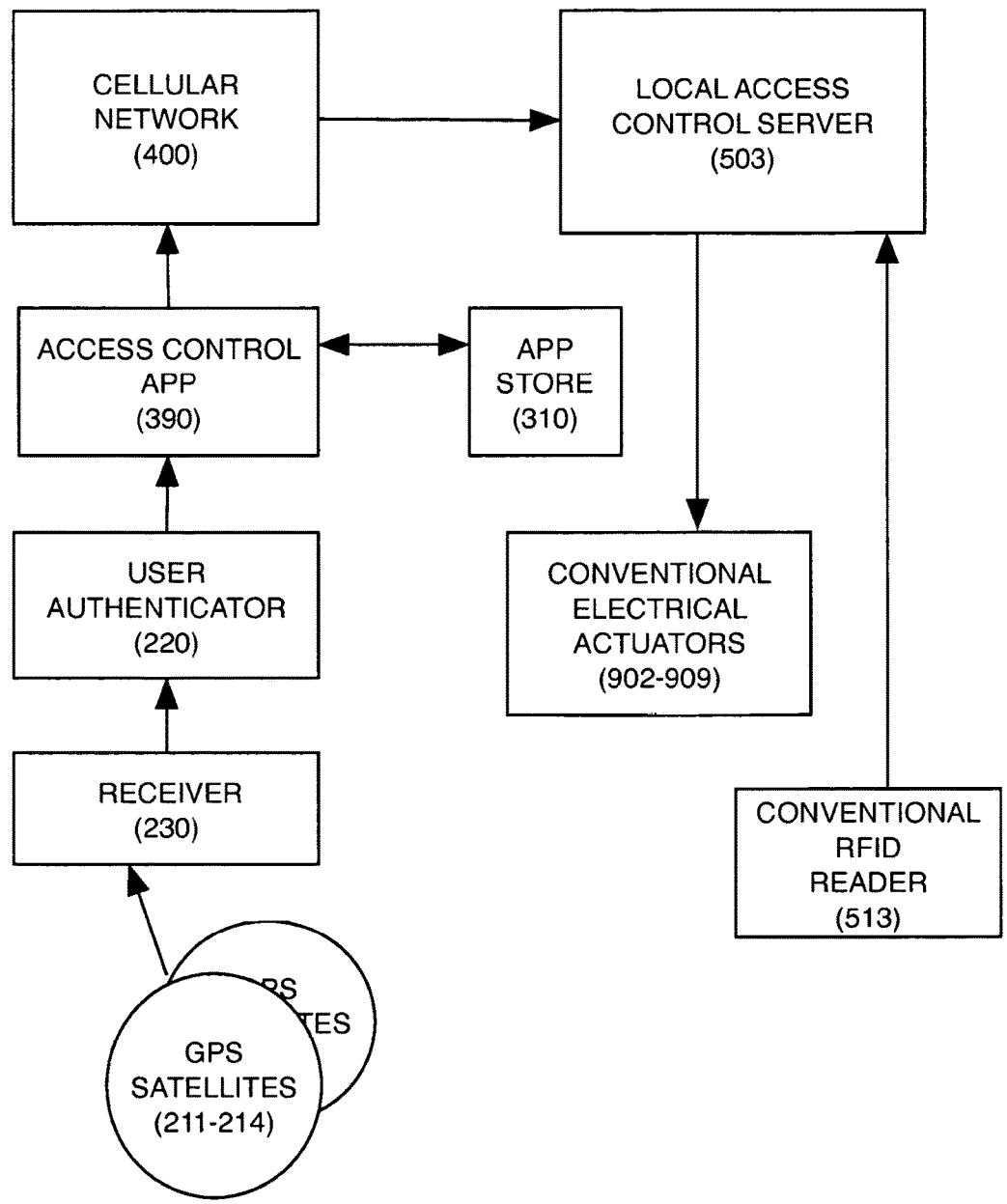

Referring now to FIG. 3, in an embodiment, a system includes: an RFID Reader 513 (reader), coupled to a local access control server 503 (server); the server further coupled to one or more electrical actuators 902-909; the server further coupled to an access control App 390 (App) via a cellular network 400; the App further coupled to an App Store 310, to a user authenticator 220, and to at least one receiver 230, wherein said receiver determines a geo-location estimate by analyzing signals from transmitters such as but not limited to GPS satellites 211-214.

Figure 4:
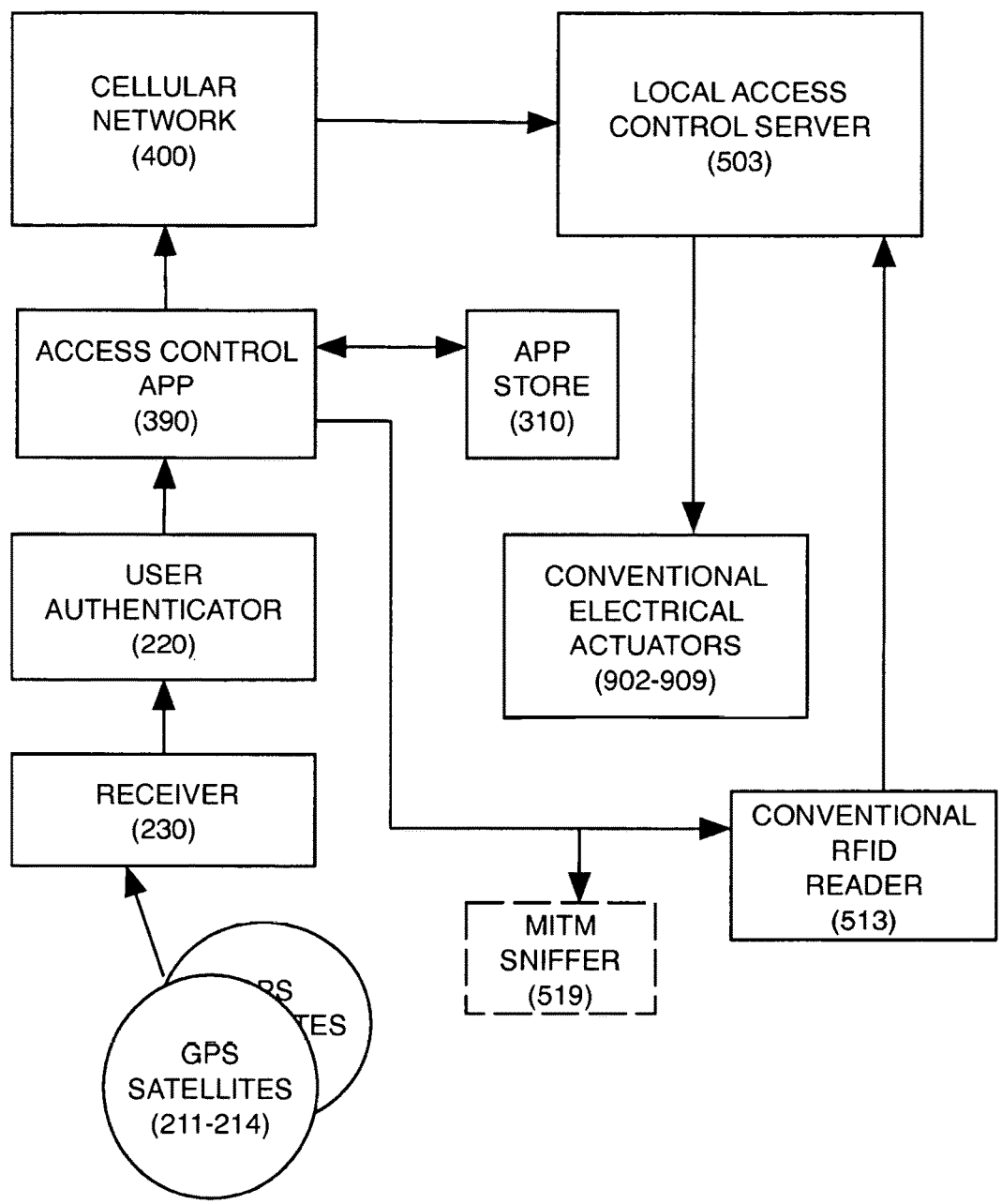

Referring now to FIG. 4, in an embodiment, a system includes: an RFID Reader 513 (reader), coupled to a local access control server 503 (server); the server further coupled to one or more electrical actuators 902-909; the server further coupled to an access control App 390 (App) via a cellular network 400; the App further coupled to an App Store 310, to a user authenticator 220, and to at least one receiver 230; wherein the App may transmit an NFC, RFID, Bluetooth, or other radiofrequency packet for amusement or confirmation to the reader 513 which may be observable to a man-in-the-middle sniffer 519, and wherein the receiver obtains a geo-location estimate from analyzing signals from transmitters such as GPS satellites 211-214.

Figure 5:
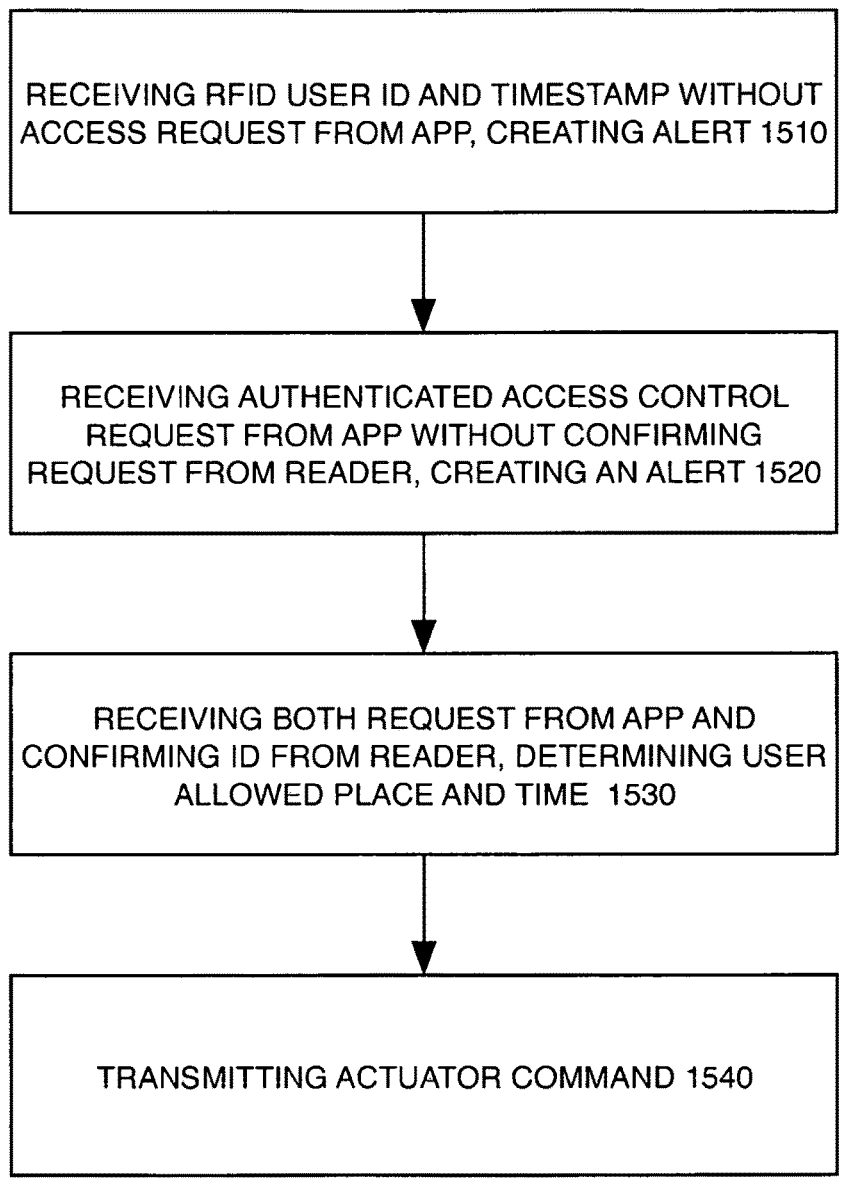
FIGS. 5-9 are flowcharts of methods.

Referring now to FIG. 5, in an embodiment, a method is disclosed for operation of an Access Control Server 503 (Server) communicatively coupled by a cellular network 400 to an Access Control App 390 (App); the server coupled to at least one actuator 902-909; and further coupled to a radiofrequency (RF) Reader 513, the method 1500 comprising: on a condition that RF Reader 513 has received a user identity and timestamp not confirmed by an access control request from the App, creating an Alert 1510 to surveillance operator and blocking access; on a condition that the server has received via the cellular network 400 an access control request from an authenticated Access Control App 390 which contains an authenticated user id, a GLE coordinate, and a timestamp; determining that the user is allowed access at the GLE area portal, during the requested time; and creating an Alert 1520 to surveillance operator and blocking access when not having received a confirming user identity and timestamp from RF Reader 513; on a condition that the server receives via the cellular network 400 an access control request from an authenticated Access Control App 390 which contains an authenticated user id, a GLE coordinate, and a timestamp; determining that the user is allowed access at the GLE area portal, during the requested time; and receiving 1530 a confirming user identity and timestamp from RF Reader 513, transmitting an access command 1540 to an actuator 902-909.

Figure 6:
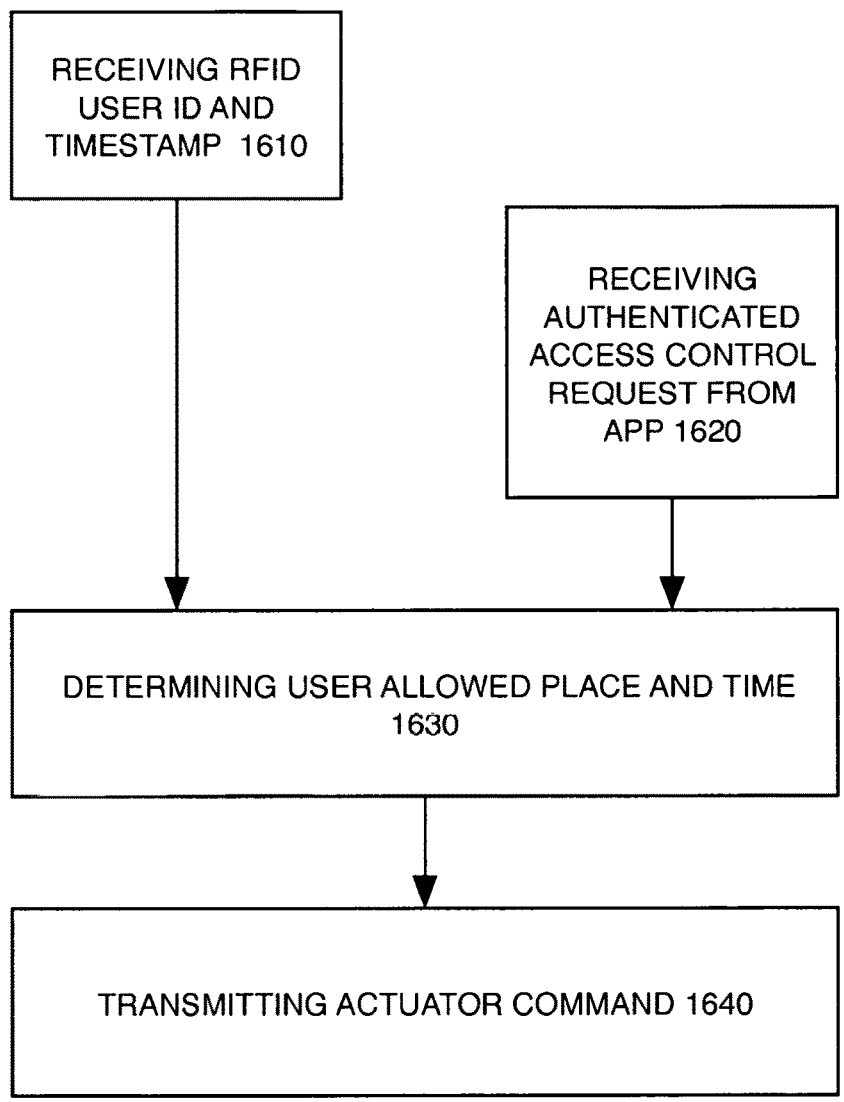

Referring now to FIG. 6, in an embodiment, a method is disclosed for operation 1600 of an Access Control Server 503 (Server) communicatively coupled by a cellular network 400 to an Access Control App 390 (App); the server coupled to at least one actuator 902-909; and further coupled to a radiofrequency Reader 513, the method comprising: a) receiving a user identity and timestamp 1610 from radio frequency Reader 513; OR b) on a condition that the server receives via the cellular network 400 an access control request from an authenticated Access Control App 390 which contains an authenticated user id, a GLE coordinate, and a timestamp 1620; THEN when a or b, determining that the user is allowed 1630 access at the GLE area portal, during the requested time; and transmitting an access command 1640 to an actuator 902-909.

Figure 7:
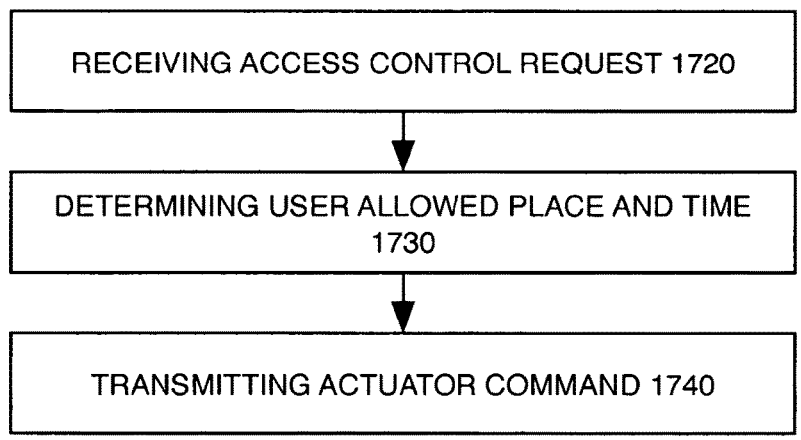

Referring now to FIG. 7, in an embodiment, a method is disclosed for operation 1700 of an Access Control Server 502 (Server) communicatively coupled by a cellular network 400 to an Access Control App 390 (App); the server coupled to at least one actuator 902-909; the method comprising: on a condition that the server receives 1720 via the cellular network 400 an access control request from an authenticated Access Control App 390 which contains an authenticated user id, a GLE coordinate, and a timestamp; determining 1730 that the user is allowed access at the GLE area portal, during the requested time; transmitting 1740 an access command to an actuator 902-909.

Figure 8:
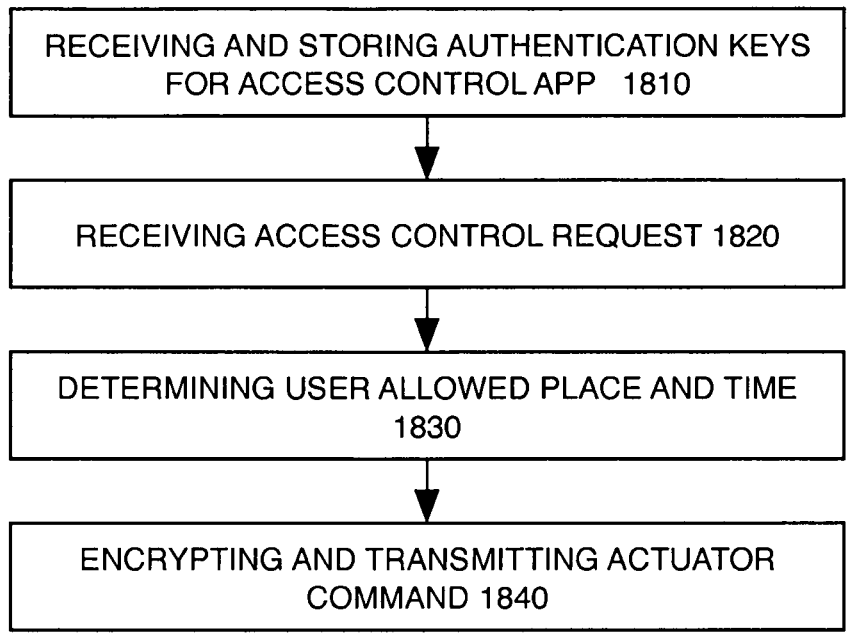

Referring now to FIG. 8, in an embodiment, a method is disclosed for operation 1800 of an Access Control Cloud Server 500 (Server) communicatively coupled by a cellular network 400 to an Access Control App 390 (App); the server coupled to an App Store 310, and in an embodiment the server communicatively coupled to at least one actuator 902-909 via a cryptographically secure IP network 700, 800; the method comprising: receiving and storing 1810 authentication keys from the App Store for each instance of an installed access control app 390, receiving via the cellular network 400 an access control request 1820 from an authenticated Access Control App 390 which contains an authenticated user id, a GLE coordinate, and a timestamp; determining 1830 that the user is allowed access at the GLE area, during a range containing the requested time; and encrypting and transmitting 1840 an access actuator command to an actuator within a specified area bounding the GLE coordinate of the access request.

Figure 9:
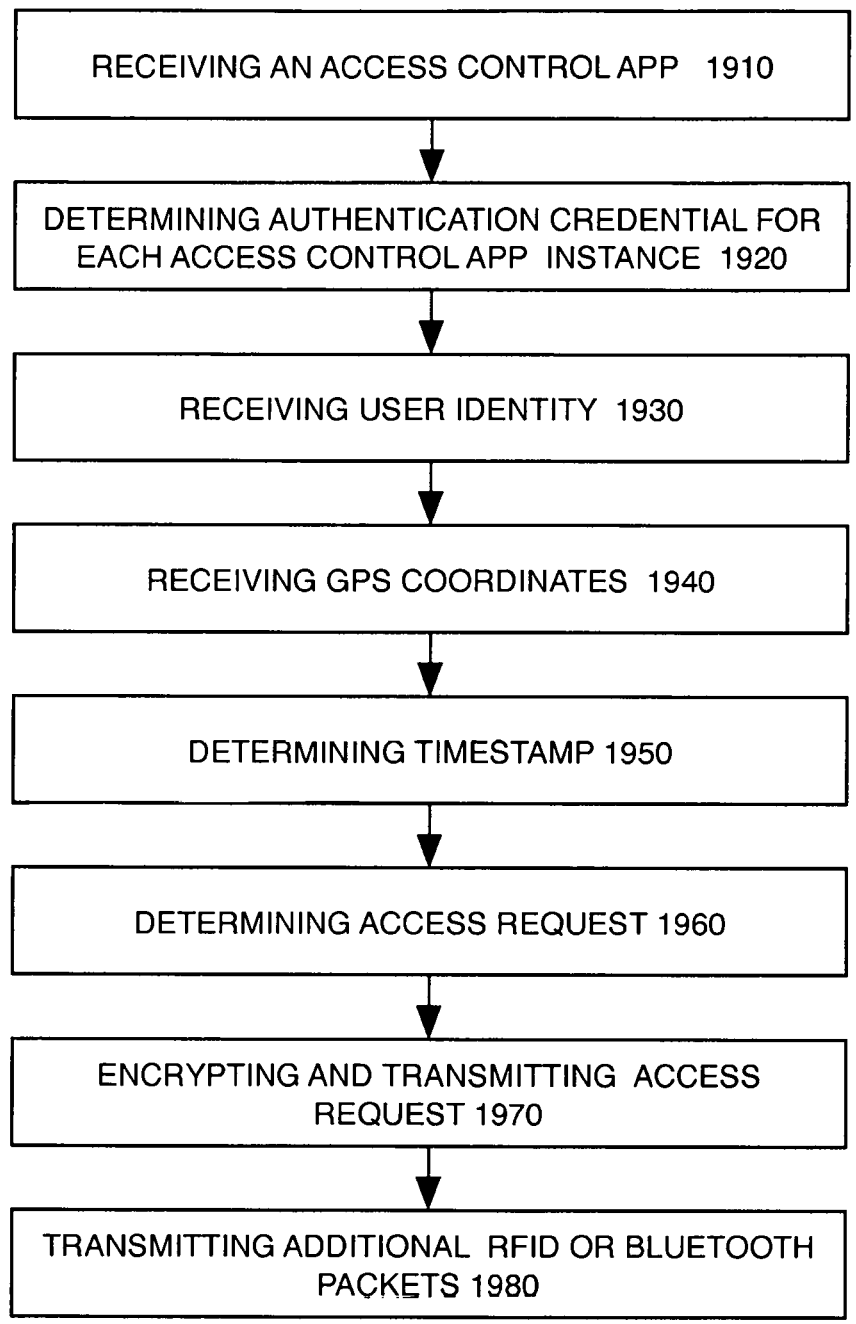

Referring now to FIG. 9, in an embodiment, a method 1900 is disclosed for operation of an application processor and a baseband processor within a mobile communication device performing computer executable instructions which cause the processors to perform: receiving from an App Store an Access Control App 1910 in an embodiment signed by a CA, determining authentication credentials for each instance of an installed App 1920, receiving from a user authenticator circuit a user identity 1930, receiving from a receiver circuit a GLE coordinate (such as provided by the Global Positioning System aka GPS) 1940 which estimates the present geo-location of the mobile communication device, determining a timestamp 1950; determining an access control request for the user within a time range within an area surrounding the GLE 1960; encrypting the request and transmitting it 1970 via a cellular network to one of a local access control server 503 or an Access Control Cloud Server 500; and in an embodiment, transmitting 1980 one of a confirming access request to an RFID Reader 513, or a deception rfid poison pill to a Man-in-the-Middle (MITM) sniffer.

Figure 10:
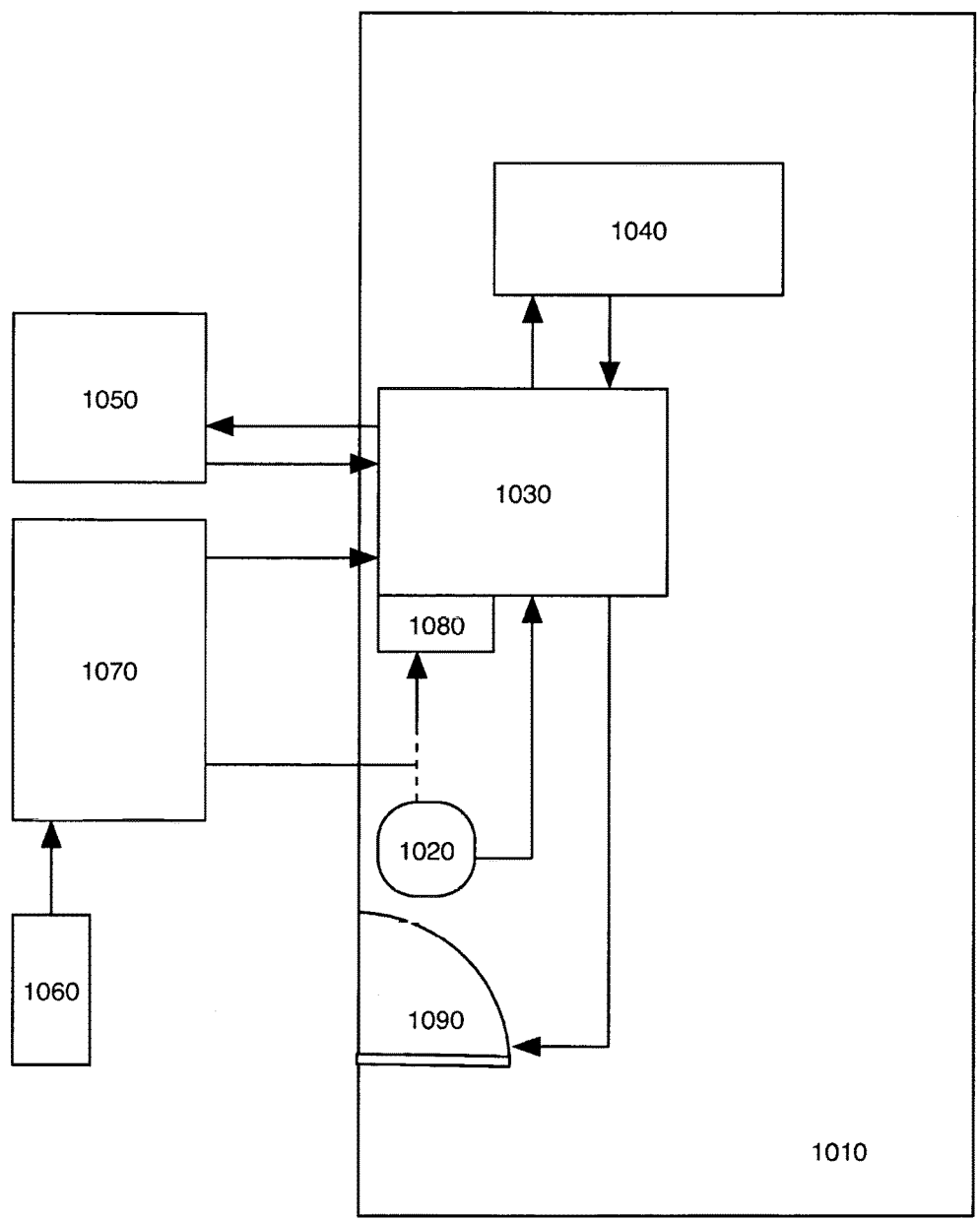
FIG. 10 is a dataflow diagram of system operation.

Referring now to FIG. 10, System 1000 includes components of an interconnected access control system for an access controlled enclosure. Enclosure 1010 prevents public access except to authorized users who are allowed during certain time ranges to transit a particular portal 1090.

An RFID/NFC energizer-reader 1020 installed next to a portal provides access to anyone holding a keycard containing identity information of an authorized user.

A panel 1030 receives identity information obtained by each reader 1020 of an enclosure 1010 and energizes actuators which control the electrically operable portals 1090.

A local computing device 1040 receives identity information from a panel 1030, searches a store of authorized identities and rules, and causes the panel to energize an actuator when the identity information presented at a reader is consistent with the store.

A remote shared computing device 1050 receives identity and portal information from a panel, determines from a store if the access is allowed and causes the panel to energize an actuator when the identity information presented at a reader is consistent with the store A mobile wireless device 1060 transforms GLE coordinate information from a plurality of receivers and identity information from an identification circuit, and transmits it to wireless connected cloud server 1070. Verification of identity, GPS coordinate, access control, and time of day may be performed in the mobile device, in the cloud server, or in the local server.

A wireless connected cloud server 1070 receives GLE and identity information from a mobile wireless device, determines a condition that the geo-location estimate coordinate of the mobile device is within a specified range of a portal, validates access permission for the identity at that place and time, and causes a panel to energize an actuator.

A panel adapter 1080 couples to a panel and presents the credential information consistent with that received by a key card reader when a wireless server receives GLE and identity information that is consistent with a store.

Portal 1090 is an electrically operable hatch, door, or elevator.

Figure 11:
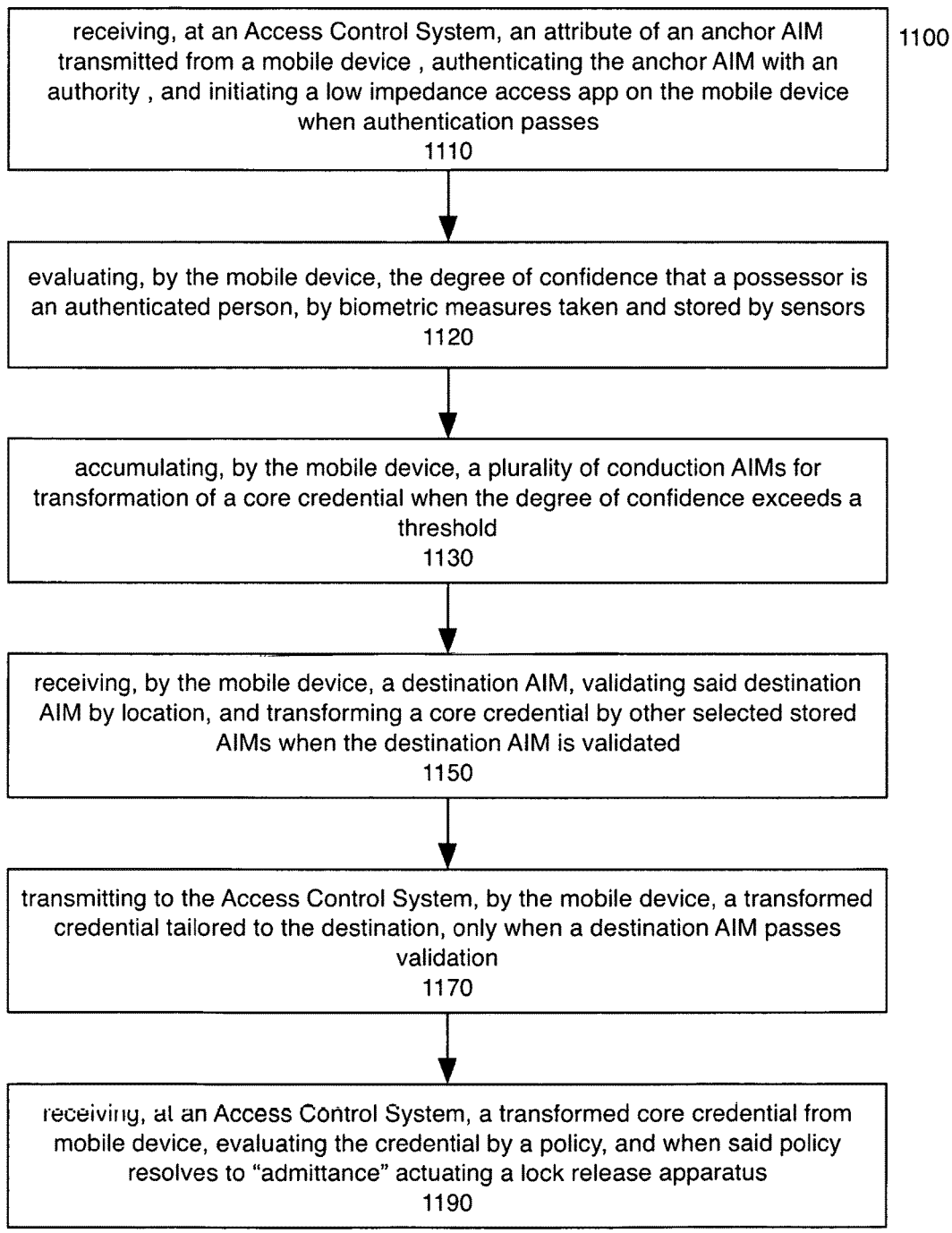
FIGS. 11-13 are flowcharts of methods of the access control system and its communicatively coupled wireless devices.

One aspect of the invention illustrated in FIG. 11 is a method 1100 for operating a system comprising at least one mobile device communicatively coupled to an access control processor coupled to a portal actuator, the method having processes as follows: receiving, at an Access Control System, an attribute of an anchor AIM transmitted from a mobile device, authenticating the anchor AIM with an authority, and initiating a low impedance access app on the mobile device when authentication passes 1110; evaluating, by the mobile device, the degree of confidence that a possessor is an authenticated person, by biometric measures taken and stored by sensors 1120; accumulating, by the mobile device, a plurality of conduction AIMs for transformation of a core credential when the degree of confidence exceeds a threshold 1130; receiving, by the mobile device, a destination AIM, validating said destination AIM by location, and transforming a core credential by other selected stored AIMs when the destination AIM is validated 1150; transmitting to the Access Control System, by the mobile device, a transformed credential tailored to the destination, only when a destination AIM passes validation 1170; and, receiving, at an Access Control System, a transformed core credential from mobile device, evaluating the credential by a policy, and when said policy resolves to "admittance" actuating a lock release apparatus 1190.

During operation of an app, a mobile device passively accumulates conduction AIMs during a journey toward at least one policy controlled portal.

In an embodiment, a conduction AIM includes: sensor data on gait, accelerations, GPS waypoints, transit/toll fares, elapsed time from trip start, standing/sitting, sounds or electromagnetic fields measured. These could be compiled/profiled by an app on the Mobile device to enhance/transform a core credential.

During operation of an app, biometric sensors on a mobile device measure attributes of personal characteristics, which increase confidence that a possessor is legitimate person. This may be in combination with shared secret or stored parameters on the device or at the access control system.

In embodiments, an anchor AIM is validated interactively with the Access Control System prior to initiating the method above. It may require authentication by a trusted party of a document, personal characteristic, private knowledge, and is not standalone by the app on the mobile device. It is suggested that this be performed in private at a trusted secure location (your home, or workplace). Timestamped images may be captured and transmitted as attributes of an anchor AIM.

Figure 12:
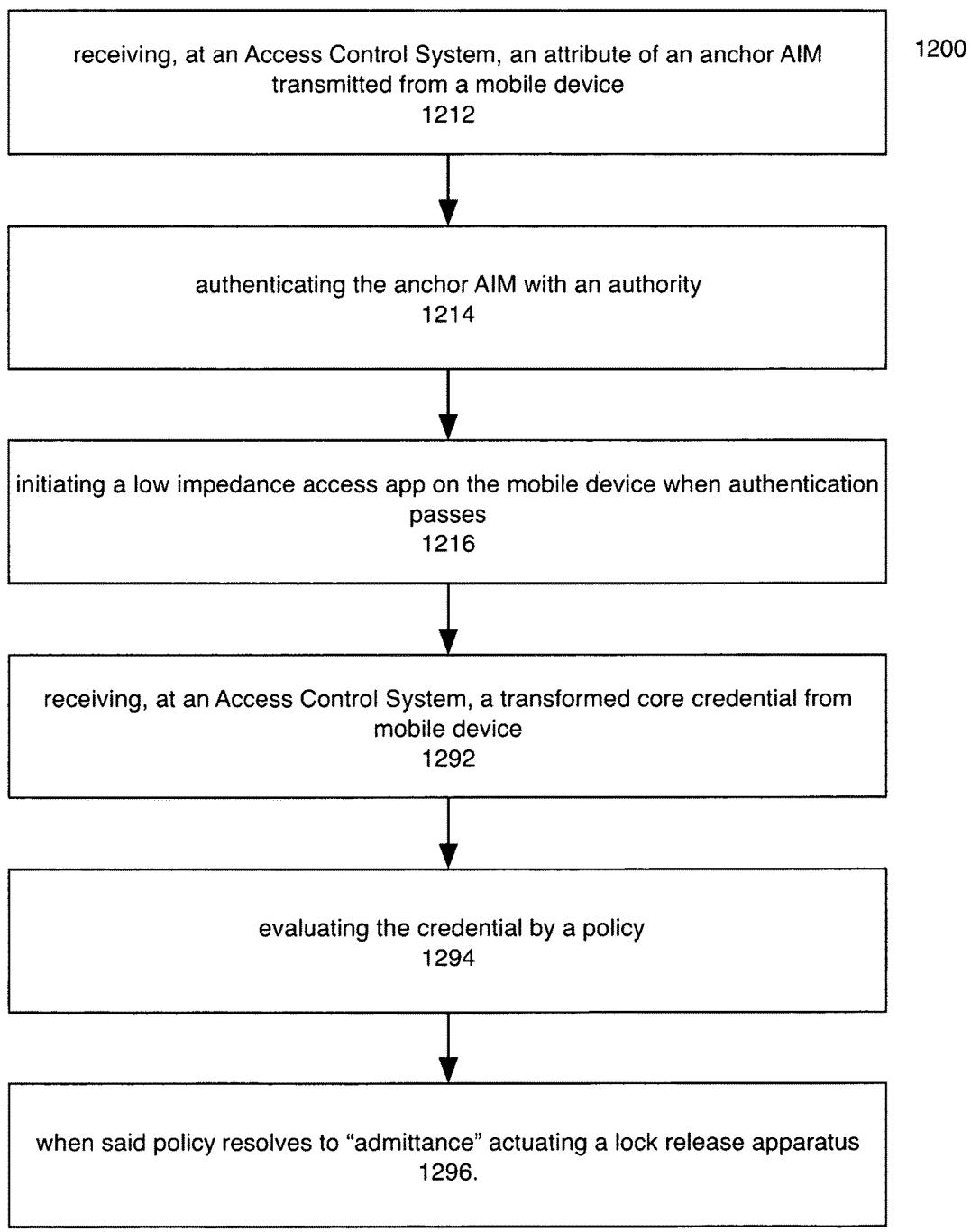

FIG. 12 illustrates another aspect of the invention as a method 1200 for operating an access control processor comprising steps as follows: receiving, at an Access Control System, an attribute of an anchor AIM transmitted from a mobile device 1212, authenticating the anchor AIM with an authority 1214, and initiating a low impedance access app on the mobile device when authentication passes 1216; receiving, at an Access Control System, a transformed core credential from mobile device 1292, evaluating the credential by a policy 1294, and when said policy resolves to "admittance" actuating a lock release apparatus 1296.

Figure 13:
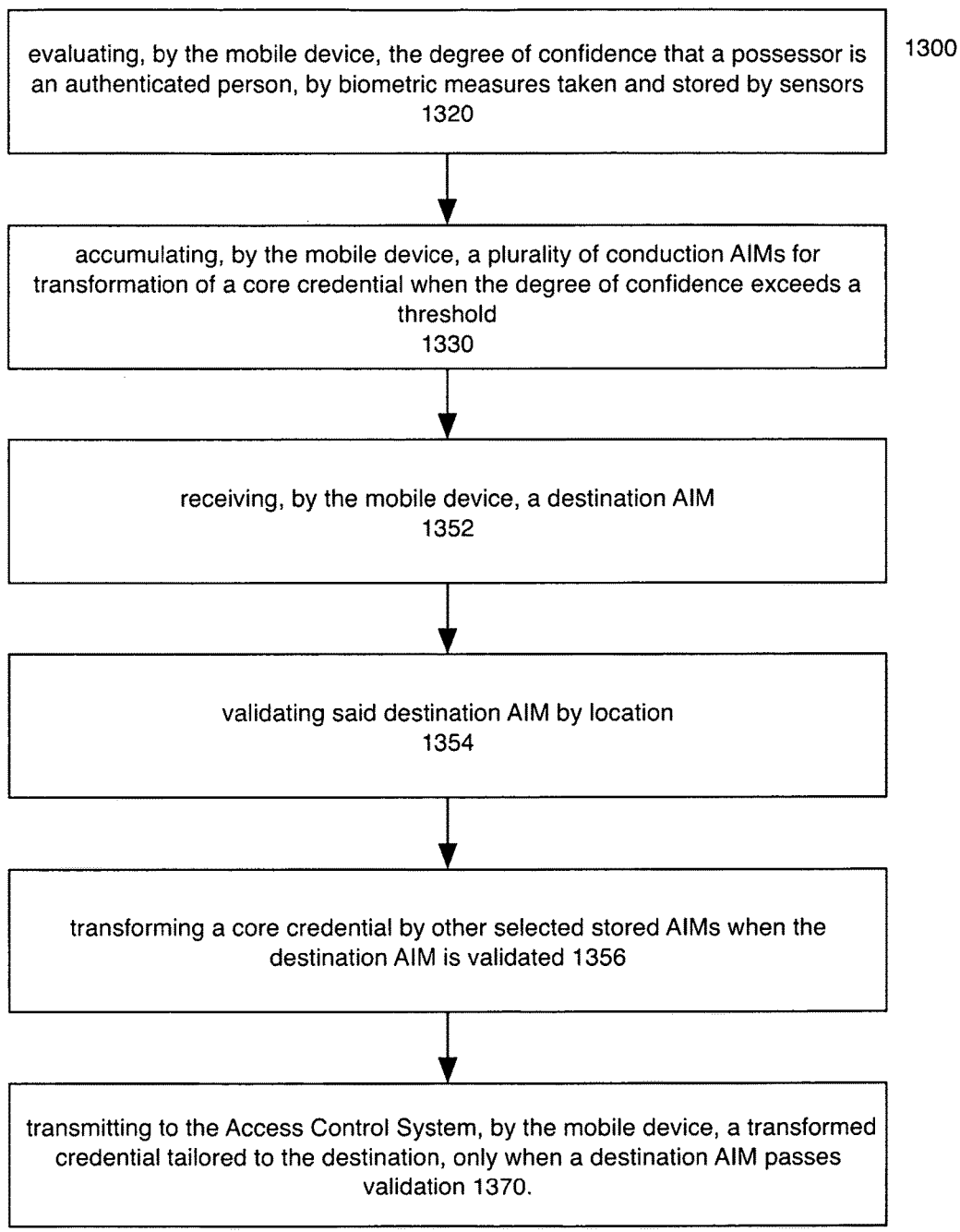

FIG. 13 illustrates another aspect of the invention as a method 1300 for operating a mobile device comprising steps as follows: evaluating, by the mobile device, the degree of confidence that a possessor is an authenticated person, by biometric measures taken and stored by sensors 1320; accumulating, by the mobile device, a plurality of conduction AIMs for transformation of a core credential when the degree of confidence exceeds a threshold 1330; receiving, by the mobile device, a destination AIM 1352, validating said destination AIM by location 1354, and transforming a core credential by other selected stored AIMs when the destination AIM is validated 1356; and, transmitting to the Access Control System, by the mobile device, a transformed credential tailored to the destination, only when a destination AIM passes validation 1370.

CONCLUSION

The techniques described herein can be implemented in digital electronic circuitry, or in computer hardware, firmware, software, or in combinations of them. The techniques can be implemented as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; internal hard disks or removable disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for authorizing a mobile device user for low impedance physical access control comprising;
   collecting and analyzing conduct during approach analytic identity measures (C-AIM);
   collecting and analyzing destination proximity analytic identity measures (D-AIM); and
   upon authorization of the mobile device user, operating an access control actuator.

2. The method of claim 1 wherein collecting and analyzing (C-AIM) comprises: at least one of
   a sequence of waypoints in approaching a portal;
   a financial transaction using wireless payment;
   passing through mass transit turnstiles or tolls;
   measurement of sitting, standing, walking times; and
   elapsed time operating the mobile device in transit.

3. A method for authorizing a mobile device user for low impedance physical access control comprising;
   collecting and analyzing biometric sensor data analytic identity measures (B-AIM);
   collecting and analyzing conduct during approach analytic identity Measures (C-AIM); and
   collecting and analyzing destination proximity analytic identity measures (D-AIM); and
   upon authorization of the mobile device user, operating an access control actuator.

4. The method of claim 3 wherein collecting and analyzing B-AIM comprises: at least one of
   an iris scan;
   a body mass;
   a stride length;
   a gait; and
   a total body electrical conductance.

5. A method comprising:
   collecting a plurality of analytic identity measures (AIMS);
   configuring at least one access credential; and
   corresponding with destination access control system, wherein corresponding comprises receiving by a radio device at least one radio signal providing location data, determining a location of the mobile device, and transmitting by the radio apparatus a configured access credential associated with the mobile device and the authenticated bearer on the condition that the location of the mobile device is within a proximity geo-fence of a portal to a controlled perimeter, whereby the mobile device is radio silent until in a vicinity of a portal.

6. The method of claim 5 wherein configuring at least one access credential comprises:
   selecting at least one collected analytic identity measure (AIM), and
   transforming each collected AIM by a timestamp and a digital credential of the mobile device and bearer, whereby each configured access credential is distinct from every previously transmitted configured access credential.

7. The method of claim 5 wherein
   collecting a plurality of AIMs further comprises:
      collecting at least one destination analytic identity measure (D-AIM) associated with a location of a portal.

8. The method of claim 7 wherein a D-AIM is one of the group of a Wi-Fi access point in the vicinity of a portal actuator, Global Positioning System coordinates,
   a cellular location service,
   and an optical signal source.

9. The method of claim 5 wherein collecting a plurality of AIMs further comprises:
   collecting at least one conduct analytic identity measure (C-AIM) wherein collecting at least one C-AIM comprises:
   at least one of the group of
   gait analysis of accelerometer readings to determine stride length, average speed, height and length of step, cadence, steps between directional change, and standing from seated position;
   financial transactions performed, using transit, food/beverage, fuel, and street vendors;
   waypoints in commute and portal approach based on GPS or location services; and
   messages sent and received during travel toward portal.

10. The method of claim 5 wherein collecting a plurality of AIMs further comprises:
   collecting at least one biometric analytic identity measure (B-AIM) wherein collecting at least one B-AIM comprises:
   at least one of the group,
   operating an iris scanner device,
   operating a microphone and audio recognition device,
   operating a camera and facial recognition device; and
   successfully matching the sensor recorded data with one of a stored B-AIM.

11. The method of claim 5 wherein
   collecting a plurality of AIMs further comprises:
      collecting at least one anchor analytic identity measure (A-AIM) wherein collecting at least one A-AIM comprises:
      operating a cryptographically secure token assigned to bearer;
      receiving a passphrase created by the bearer;
      receiving answers to security questions stored by the bearer; and
      receiving biometric sensor data recorded at bearer's origin.

* * * * *